United States Patent Office 3,380,832
Patented Apr. 30, 1968

3,380,832
METHOD OF PREPARING A SOLID SEMI-MOIST MARBLED MEAT PET FOOD
David P. Bone, Palatine, Ill., assignor to The Quaker Oats Company, Chicago, Ill., a corporation of New Jersey
No Drawing. Continuation of application Ser. No. 477,940, Aug. 6, 1965. This application Dec. 23, 1966, Ser. No. 604,489
9 Claims. (Cl. 99—7)

This application is a streamlined continuation of application Ser. No. 477,940, filed Aug. 6, 1965, now abandoned.

This invention relates to a meaty pet food having the appearance and texture similar to raw meat which is marbled throughout with fat.

An object of this invention is to provide a meaty pet food, (i.e., one containing substantial amounts of meat or meat by-products) of the semi-moist type containing 20% to 50% moisture and having the appearance of marbled meat. Another object of this invention is to provide a process by which a meaty pet food can be colored and formed to simulate different kinds and cuts of meat having varying degrees of marbling with or without an overlay having the appearance of fat. A singularly important object of this invention is to provide a processed meaty pet food which ranks very high in palatability and acceptability to animals.

These and other objects which will be apparent hereinafter are accomplished by the product and method of this invention. This product is a meaty substantially solid semi-moist animal food resembling marbled meat comprising a red portion and a white portion, said red portion containing a caseinate salt binder in an amount sufficient to cause tackiness at temperatures above 120° F., said white portion being randomly distributed in the red portion, and said red and white portions being joined to form an integral mass having substantially distinct interfaces between said portions.

The method for the manufacture of a semi-moist animal food resembling marbled meat comprises the following steps: (a) extruding by a cooking-extrusion process a first sheet of unexpanded storage-stable semi-moist animal food having the appearance of lean red meat and containing a caseinate salt adhesive in an amount sufficient to provide stickiness at temperatures above 120° F.; (b) extruding by a cooking-extrusion process a second sheet of unexpanded storage-stable semi-moist animal food having the appearance of fat, said cooking-extrusion process comprising the steps: (1) admixing comminuted animal food ingredients which include a total moisture content between about 20% and about 50%, said ingredients having been selected to provide a substantially solid, storage-stable nutritious pet food after cooking the resulting admixture, (2) subjecting the resulting admixture to cooking conditions at a superatmospheric pressure sufficient to prevent substantial expansion of the resulting plastic mass in the extruder, and (3) extruding the resulting plastic mass through a die into the atmosphere; (c) superimposing one of said sheets on the other; and (d) forming superimposed sheets into a loaf-like mass, said forming being done in such a manner as to distribute randomly the fat-like portion in the resulting mass, said forming taking place while the average temperature of said first and second sheets is between about 120° F. and about 170° F.

The selection of specific nutritive ingredients to provide a substantially solid, storage-stable, nutritionally balanced pet food is well within the purview of one with ordinary skill in the art. Specific formulations are presented hereinafter, however, to illustrate several preferred embodiments of this invention. The preferred adhesive for use in this invention is sodium caseinate. This adhesive, which is nutritious and relatively stable at extruder-cooker conditions, is preferably admixed with the other ingredients prior to the cooking and extrusion in an amount greater than 7½% by weight based on the weight of the ingredients. However, other caseinate salts can be used, such as those of calcium and potassium.

I have discovered that the inclusion of the caseinate adhesive in the semi-moist pet food ingredients prior to the cooking-extrusion step provides an extrudate which is tacky, or sticky, at temperatures above about 120° F. (The minimum amount of caseinate required to provide stickiness depends on the specific ingredient formulation selected, and can be readily determined by adding different amounts to small trial batches.) I have also discovered that such extrudate, after being shaped into sheets, may be formed into marbled meat-like loaves by merely bringing the sheets in contact with each other at temperatures above about 120° F. to provide a novel pet food product which is structurally stable and has no significant tackiness at room temperature and at temperatures normally contemplated during storage. While it is essential that the red portion contain the specified amounts of the caseinate binder, it is more preferred that both red and white portions contain the binder. I have also discovered, however, that the step of forming the superimposed extrudate sheets into a loaf-like mass must be carried out at a temperature below about 170° F. or the resulting product will not resemble marbled meat. At temperatures above 170° F., the forming step results in a "bleeding" or infusion of the lean meat-like layer into the fat-like layer and vice versa, and the marbling appearance is substantially not achieved. The average temperature of the sheets may be measured, for example, by forming the sheets into a baseball-sized wad and inserting a thermometer into the wad.

While the dimensions of the first sheet referred to above are not critical, it may be a continuous or perforated sheet-like extrudate having a width from several inches to many feet, and preferably a thickness between about ⅟₁₆ inch and about ½ inch. The dimensions of the second sheet are not critical also, except, as indicated below, the second sheet preferably covers less than half the contacted surface of the first sheet. It also may be continuous, discontinuous or perforated and is incorporated into the finished product in an amount up to about 45% by weight of the finished product. However, in the production of a beefsteak-like product, it is preferred that the second fat-like sheet be used in an amount between about 15% and about 25% by weight in the interior portions of the roll or cut, and it is usually preferred that an overlay of approximately ¼ inch be laid down at the circumference of the roll. In the manufacture of a ham-like product, it is preferred that the second sheet be used in an amount between 5 and 10% by weight of the interior or central portions of the roll and it is usually preferred that an overlay of approximately ¼ inch be laid down on the circumference of the roll. Whenever a fat-like overlay is used, it is essential that the fat-like extrudate used in the overlay contain the caseinate adhesive in an amount sufficient to provide stickiness at temperatures above 120° F., and that the average temperature of the sheet be between 120° and 170° F. when being laid down.

Steak-like cuts can be prepared by slicing rolls of appropriate diameter; cuts resembling chops are prepared by slicing smaller diameter rolls or loaves which may have a relatively heavy fat-like overlay. The most preferred form of the product of this invention is obtained by slicing the loaves into cubes approximately ½ inch on an edge.

While a loaf can be formed around a prefabricated bone-like structure, the preferred products of this invention are "boneless." If a structure resembling bone is used, it must be either inert with respect to water pick-up, or it must have approximately the same water activity as the surrounding material.

In the practice of this invention it is essential that the fat-like extrudate be distributed randomly through the product except for the overlay referred to above. In the practice of this invention various methods of forming the superimposed sheets into a loaf-like mass may be employed, therefore, providing the method results in the substantially random distribution of the fat-like portion through the product. A certain degree of randomization is accomplished by forming a fat-like extrudate sheet of inconsistent and irregular thickness. Also, a certain degree of the randomization can be accomplished by superimposing the fat-like extrudate on the lean meat-like extrudate sheet in an irregular or random pattern. It is preferred that the fat-like extrudate sheet have a width less than half the width of the lean meat-like sheet and that the fat-like sheet be distributed in an irregular random fashion on the extrudate sheet. In a preferred embodiment, several narrow ribbons of fat-like extrudate are laid down on a wide sheet of red extrudate. It is preferred that the superimposed fat-like sheet cover much less than half the contacted surface (normally the top surface) of the lean meat-like extrudate sheet. As indicated above, the fat-like sheet may be continuous, discontinuous and/or perforated. Also, the extrudates can be flattened or smeared into a sheet-like shape. Perforation-like irregularities can be achieved by extruding the fat-like portion in such a manner that large bubbles of steam are formed upon extrusion so that crater-like depressions result when the bubbles burst, or collapse. The more randomization that is accomplished when the fat-like sheet is superimposed on the lean meat-like sheet, the less the randomization will be required when the superimposed sheets are formed into a loaf-like mass. Also, the superimposing step and the loaf-forming step can be performed simultaneously.

The forming of the superimposed sheets into a loaf-like mass may be accomplished in accordance with this invention by several methods, such as, for example, (a) permitting the superimposed sheets to form a random pile beneath the end of the conveyer and compressing this tangled pile into a wad, (b) catching the superimposed sheets in a forming means, such as a pan, while the first and second sheets are at the specified temperatures and thereafter permitting the randomly distributed layers to integrate as a result of their own plasticity weight, and tackiness, and (c) rolling the superimposed sheets into a roll.

In the preferred embodiment of this invention in which the superimposed sheets are rolled into a roll, little additional randomization may be necessary during the rolling step if a high degree of randomization was achieved during the step of superimposing the first and second sheets. However, it is generally preferred that when the superimposed sheets are formed into a roll, they be randomly laid down in a zone along the periphery which is at least twice the width of the red sheet. Hence, if a 4-inch wide ribbon or sheet of lean meat-like extrudate is being utilized, a minimum size loaf to be formed by the preferred rolling embodiment would be approximately 8 inches. On the other hand, for example, a continuous roll may be formed by continuously laying a 3-inch wide lean meat-like sheet (on which the second fat-like sheet has been superimposed) across a 6 to 16 inch zone at the end of a continuously revolving roll or loaf while continuously withdrawing the resulting formed roll at such a rate as to keep the roll between about 5 inches and about 10 inches in diameter. Occasionally, in this preferred embodiment, superimposed sheets coming off a conveyer, for example, may form loose random piles or wads behind a retreating revolving roll. These wads of extrudate are simply pushed into the end of the roll to incorporate them into the loaf or roll, and the resulting loaf end is then wrapped randomly by the oncoming superimposed sheets as before. If a wider diameter roll is formed, it can be kneaded or worked down to a loaf of desired size, provided the diameter reduction is carried out while the interior of the loaf is at a temperature between about 120° F. and 170° F. Generally speaking, the surface or "skin" of the roll will quickly fall below this temperature so that the "skin" is no longer tacky. Also, a plurality of smaller rolls can be formed into a "bundle" resembling a bundle of distinct major muscles by contacting the rolls at a temperature between about 120° F. and 170° F., and applying sufficient pressure to convert them into an integral mass. The resulting bundle can be overlaid with a fat-like layer, if desired, in the manner described above. Slices of such multi-roll bundles can resemble the multi-muscle cuts such as, for example, round steak.

The randomized laying down of the superimposed sheets into a roll is done in such a way as to minimize the formation of air pockets in the rolled product. In the description of the process of this invention, therefore, the term rolling is intended to connote that the sheets are manipulated to cause contact in such a manner, e.g., with adequate pressure, to bring about adhesion with a minimum of air pockets and yet without substantial infusion of the white material into the red material.

Generally, the formulation of a pet food to provide storage stability is within the purview of one skilled in the art. In the practice of this invention a preferred formulation with respect to storage stability is one in which the water activity of the product is less than 0.90 and also contains an effective amount of mold inhibitor, such as sorbic acid or its salts. Water activity ($a_w$) as used herein is defined as follows:

$$a_w = \frac{f}{f_0}$$

where:

$f$ = fugacity of water vapor in the specified system
$f_0$ = fugacity of pure water at the specified system temperature and 1 atmosphere total pressure.

Fugacity is a well-known physical-chemical term adequately defined in any appropriate text, such as Physical Chemistry, Prutton and Maron (1949) p. 318. As is apparent to those skilled in the art, water activity in the desired range is achieved by including appropriate quantities of soluble materials such as sugars and glycols in the formulation.

We have found that formulations such as those listed in the numbered examples following using sugar in an amount between about 15 and 30% and propylene glycol in an amount between about 2 and about 10% and sorbic acid or its salts in amounts from 0.06 to 0.3% provide adequate storage stability for the products of this invention which contain moisture in an amount between about 20% and about 40% by weight based on the weight of the product.

The extrusion conditions in the method of this invention are such that the ingredients are cooked; preferably temperatures between 190° and 300° F. are used in the extruder with the pressure in the extruder being sufficient to prevent substantial expansion of the resulting plastic mass in the extruder. I have discovered that the use of starch-containing ingredients, such as cereals or cereal fractions such as starch, are not essential to the practice of this invention in its broadest aspects. It is nonetheless preferred that the ingredients contain at least ½ of 1% starch. I have discovered that while meaty pet foods produced in accordance with this invention which are devoid of starch have the necessary appearance and texture of marbled meat, they do not have a preferred degree of structural stability at elevated storage temperatures, i.e., above 120° F., e.g., 130° F. to 135° F. I have discovered that including starch in an amount greater than ½ of 1% in the ingredients prior to cooking provides a product which is structurally stable to an eminently satisfactory degree under storage conditions at 135° F., provided temperatures in excess of 250° F. are achieved in the extruders, during the manufacture of the product.

As used herein, the term meaty indicates that a substantial portion of the ingredient list is made up of meat or meat by-products. The term meat is understood to apply to the flesh of cattle, swine, sheep, goats, horses, whale and other mammals, poultry and fish. The term meat by-products includes such constituents as are embraced by that term in the definitions of feed ingredients published by the Association of American Feed Control Officials Incorporated. The following examples set forth certain preferred formulations for pet foods which embody the principles of the present invention. As used herein, the term "parts" and the term "percent" (or "%") refer to parts by weight and percent by weight, respectively.

Example 1

This example illustrates the manufacture of a beef-like marbled meaty pet food which does not melt at 135° F.

The ingredients making up the "base," and making up the "marbling," were thoroughly mixed in separate blenders, in the proportion indicated in Table 1.

TABLE 1

| | Percent | | |
| --- | --- | --- | --- |
| | Base | Marbling | Total Formula |
| Beef Tripe | 29.0000 | 42.50 | 32.3750 |
| Sugar, Ready Mix Grade | 26.5778 | 26.50 | 26.5584 |
| Sodium Caseinate | 15.0000 | 15.09 | 15.0000 |
| Beef Trimmings, 40% Lean | 13.5000 | | 10.1250 |
| Corn Starch | 7.5000 | 7.50 | 7.5000 |
| Propylene Glycol | 4.5000 | 4.50 | 4.5000 |
| Dicalcium Phosphate, Dihydrate | 2.5000 | 2.50 | 2.5000 |
| Salt, Iodized | 1.2000 | 1.20 | 1.2000 |
| Potassium Sorbate | 0.1000 | 0.10 | 0.1000 |
| Vitamin E Supplement (20,000 IU/lb.) | 0.0670 | | 0.0503 |
| Titanium Dioxide | | 0.20 | 0.0500 |
| Riboflavin Supplement (4 g./lb.) | 0.0270 | | 0.0202 |
| Vitamin A Supplement (30,000 IU/lb.) | 0.0178 | | 0.0134 |
| Irradiated Dried Yeast | 0.0040 | | 0.0030 |
| F D & C Red No. 2 | 0.0027 | | 0.0020 |
| F D & C Yellow No. 6 | 0.0027 | | 0.0020 |
| Thiamine Mononitrate | 0.0010 | | 0.0007 |
| Total | 100.0000 | 100.0000 | 100.0000 |

The material referred to as "Base" in Table 1 results in the first sheet referred to above as having the appearance of lean meat while the material referred to as "Marbling" in Table 1 results in the second sheet described above as having the appearance of fat. The base ingredients and the marbling ingredients were mixed separately and the resulting mixtures were charged to separate extruders at such a rate that the weight ratio of base extrudate to marbling extrudate was approximately 3:1. The conditions in the two extruders were substantially identical. The extruders were steam jacketed, and the combination of friction and externally applied steam heat resulted in the achievement of peak temperatures in the extruders in the range of approximately 260° F. to 275° F. The pressures utilized were adequate to prevent substantial expansion of the plastic mass within the extruder. Prior to expulsion from the extruder through the sheeting die, the compressed plastic mass was forced through a cooling section consisting of a pipe-like projection from the end of the extruder with the result that the temperature of the plastic mass at the die was substantially below the peak temperature range (260°–275° F. referred to above). This cooling step is desirable in that it minimized popping and spattering of the extrudate. The sheeting die utilized in the extrusion of the base provided an extrudate which was approximately 3 inches wide, and generally between 1/16 and 1/2 inch thick. The die utilized in the extrusion of the marbling sheet provided an extrudate sheet which was approximately 1½ inch wide and likewise between about 1/16 and 1/2 inch in thickness. Upon leaving the extruder, the extrudate develops large bubbles, e.g., in the order of from 1/2 to 1¼ inch in diameter which pop leaving an irregular surface on the unexpanded extrudate. The first sheet resulting from the extrusion of the base material was laid down on a moving conveyor belt and the second sheet resulted from the extrusion of the marbling ingredients was laid down on top of the first sheet on the conveyor belt. The second sheet was laid down, however, in an irregular and non-uniform pattern by rolling, skipping and balling portions of the second sheet prior to and/or upon its contact with the first sheet. The purpose of this is to randomize the distribution of the marbling sheet on the lean meat-like first sheet in such a manner that only about a fourth of the surface of the first sheet was covered by the fat-like extrudate. The conveyor carried the superimposed sheets for sufficient length to permit the temperatures of the extrudates to drop to approximately 150° F. before the sheets were rolled into a roll. The roll was formed in such a manner as to provide the shape of a long loaf approximately 3 feet in length. As this loaf was continuously revolved around its longitudinal axis, the superimposed extrudate sheets coming off the conveyor were wound in random back and forth fashion until a loaf about eighth inches in diameter was formed. Several loaves of equal size were prepared in this manner. The extrusion of the lean meat-like portion was then terminated. The extrusion of the marbling portion continued, however, and each of the 3 foot by 8 inch loaves previously produced were given an overlay of marbling portion between about 1/4 and about 3/4 of an inch in thickness by replacing the loaf in the rolling device below the end of the conveyor and wrapping the fat-like extrudate around the continuously rotating loaf.

These loaves were permitted to cool to approximately room temperature, at which time they were cut into "steaks" approximately 3/4 of an inch in thickness. However, to facilitate production rates, the loaves may be cut immediately after forming, as desired. The "steaks" resembled marbled beef in that the red, lean meat portion was marbled throughout in a random fashion by the fat-like portion. "Steaks" produced in a substantially identical manner were further cut into cubes approximately ½" x ½" x ¾" and fed to dogs in a feeding test in which the fresh beef stew meat cut into cubes of substantially the same dimensions was used as a control. It was found that the product of this invention ranked equal to the fresh beef stew meat with respect to acceptability by the animals.

Example 2

This example illustrates the production of a pet food resembling ham in appearance. A batch of ingredients, hereinafter referred to as base, and another batch of ingredients, hereinafter referred to as marbling, were thoroughly admixed in accordance with the formulation specified in Table 2.

TABLE 2

| | Percent | |
| --- | --- | --- |
| | Base | Marbling |
| Tripe | 29.0 | 42.5 |
| 40% Beef | 13.5 | |
| Sucrose | 24.2 | 24.2 |
| Caseinate | 15.0 | 15.0 |
| Food Grade Dicalcium Phosphate | 2.5 | 2.5 |
| Propylene Glycol | 4.5 | 4.5 |
| Salt | 1.2 | 1.2 |
| Sodium Sorbate | 0.1 | 0.1 |
| Corn Starch | 10.0 | 10.0 |
| F D & C Red No. 2 | 0.0015 | 0.0015 |
| F D & C Yellow No. 6 | 0.0015 | 0.0015 |
| Ttoal | 100.00 | 100.00 |

The thoroughly mixed ingredients were charged to separate extruders as in Example 1, except that the weight ratio of the quantity of base to marbling was approximately 19:1. The extrusion conditions, the manner of superimposing the extrudate sheets, the rolling of the extrudate sheets and the overlaying of the resulting roll with a layer of marbling extrudate were carried out as indicated in Example 1 except that the random superimposing of the fat-like sheet on the lean meat-like sheet covered only about 5% of the top surface of the lean meat-like sheet. The loaf resulting from Example 2 was sliced into "steaks." The sliced product was observed to closely resembled hamsteaks. The products of both Example 1 and Example 2 were subjected to stability tests in which temperatures of 135° F. were encountered, and it was found that the appearance and the structure of these products were substantially unchanged.

Example 3

In this example lower extrusion temperatures (i.e., 200–212° F.) were utilized with a formulation which was devoid of starch with the result that the resulting product reverted to an integral amorphous plastic mass when stored at temperatures between 120° F. and 135° F. even though at room temperatures the product had had the appearance and consistency of marbled meat. In this example the formula utilized in Example 1 above was followed, except that the 7.5% corn starch was replaced by an equal additional quantitiy of sugar. The other conditions of Example 1 were followed.

Generally speaking, I prefer the type of formulation specified in Table 3 for use in accordance with this invention.

TABLE 3.—PREFERRED FORMULATION

| | Percent |
|---|---|
| Meat and/or meat by-products | 30–70 |
| Sodium caseinate | 7.5–25 |
| Sugar | 15–30 |
| Propylene glycol | 2–10 |
| Starch | 0.5–10 |
| Supplements (vitamins, etc.) | 1–5 |
| Flavor and color ingredients | as desired |

It is noted that the meaty marbling portion of the ingredients illustrated in Examples 1, 2 and 3 above contain no red-meat ingredients. As used herein, the term "sugar" includes sucrose, glucose, corn-syrup sugars, and the like. I have found that the addition of from 0.2 to 0.4% titanium dioxide to the marbling ingredients assists in the achievement of a white fat-like appearance.

Although the description of this invention has included considerable detail, the particularity is not intended to limit the scope except as defined in the appended claims.

Therefore, I claim:

1. A method for the manufacture of a substantially-solid semi-moist animal food resembling marbled meat comprising the following steps:
   (a) forming by a cooking-extrusion process a first sheet of unexpanded storage-stable semi-moist animal food having the appearance of lean red meat, and having incorporated therein a caseinate-salt adhesive in an amounts sufficient to provide stickness at temperatures above 120° F., said amount being between 7.5% and 25% by weight based on the weight of the first sheet,
   (b) forming by a cooking-extrusion process a second sheet of unexpanded storage-stable semi-moist animal food having the appearance of fat,
      said cooking-extrusion process of steps (a) and (b) comprising the steps of:
         (1) admixing comminuted animal food ingredients which include a total moisture content between about 20% and about 50%, said ingredients having been selected to provide a substantially-solid storage-stable nutritious pet food after cooking the resulting admixture,
         (2) subjecting the resulting admixture to cooking conditions at a superatmospheric pressure sufficient to prevent substantial expansion of the resulting plastic mass in the extruder, and
         (3) extruding the resulting plastic mass through a die into the atmosphere,
   (c) superimposing one of said sheets on the other, and
   (d) forming the resulting superimposed sheets into a loaf-like mass, said forming being done in such a manner as to distribute randomly the fat-like portion in the resulting mass, said forming taking place while the average temperature of said first and second sheets is between about 120° and about 170° F.

2. A method as in claim 1 in which said second sheet contains a casein-salt adhesive in an amount sufficient to provide stickiness at temperatures about 120° F.

3. A method as in claim 1 in which said comminuted animal-food ingredients include a caseinate-salt adhesive in an amount greater than 7.5% and starch in an amount greater than 0.5% by weight of the total ingredients and in which said cooking conditions include heating said admixture to a temperature between about 170° and about 300° F.

4. A method as in claim 1 in which said ingredients include meat or meat by-products in an amount between about 30% and about 70%, sodium caseinate in an amount between about 7.5% and 25%, sugar in an amount between about 15% and about 30%, propylene glycol in an amount between about 3% and about 6%, starch in an amount between about 0.5% and about 10%, and color modifying agents; the amounts of said ingredients being expressed as percent by weight of the total ingredients.

5. A method as in claim 1 in which said forming step includes rolling the superimposed sheets into a roll.

6. A method for the manufacture of a substantially-solid semi-moist animal food resembling marbled meat and exhibiting structural stability under storage conditions at 135° F., comprising the following steps:
   (a) forming by a cooking-extrusion process a first sheet of unexpanded storage-stable semi-moist animal food having the appearance of lean red meat,
   (b) forming by a cooking-extrusion process a second sheet of unexpanded storage-stable semi-moist animal food having the appearance of fat,
      said cooking-extrusion process of steps (a) and (b) comprising the steps of:
         (1) admixing comminuted animal-food ingredients which include a total moisture content between about 20% and about 50%, a caseinate salt in an amount sufficient to cause stickiness at temperatures greater than 120° F., said salt being included in an amount between 7.5% and 25%, water soluble material in an amount sufficient to provide a product having water activity less than 0.9, and starch in an amount greater than 0.5%, the amounts of said ingredients being expressed as percent by weight of the total ingredients, said ingredients having been selected to provide a substantially-solid storage-stable nutritious pet food after cooking the resulting admixture,
         (2) subjecting the resulting admixture to cooking conditions at temperatures in excess of 250° F. and at a superatmospheric pressure sufficient to prevent substantial expansion of the resulting plastic mass in the extruder, and
         (3) extruding the resulting plastic mass into the atmosphere,
   (c) superimposing one of said sheets on the other, and
   (d) forming the resulting superimposed sheets into a loaf-like mass while the average temperature of said first and second sheets is between about 120° F. and about 170° F., said forming being done in such a manner as to distribute randomly the fat-like portion in the resulting mass.

7. A method for the manufacture of a substantially-solid semi-moist animal food resembling marbled meat comprising the following steps:
   (a) shaping into a sheet-like shape a first extrudate of unexpanded storage-stable semi-moist animal food having the appearance of lean red meat and having incorporated therein a caseinate-salt adhesive in an amount sufficient to provide stickiness at temperatures above 120° F., said amount being between 7.5% and 25% by weight based on the weight of the first extrudate, thereby producing the first sheet-like shapes,
   (b) shaping into sheet-like shapes a second extrudate of unexpanded storage-stable semi-moist animal food having the appearance of fat, thereby forming the second sheet-like shapes,
   (c) forming the first and second sheet-like shapes into a loaf-like mass while the average temperature of said sheet-like shapes is between 120° and 170° F., said forming being done in such manner as to distribute randomly the second sheet-like shapes in the resulting mass,
   said first and second extrudates being produced by a cooking-extrusion process comprising the steps of:
      (1) admixing comminuted animal-food ingredients which include a total moisture content between about 20% and about 50%, said ingredients having been selected to provide a substantially-solid storage-stable nutritious pet food after cooking the resulting admixture,
      (2) subjecting the resulting admixture to cooking conditions at a temperature between 170° and 300° F. and at a superatmospheric pressure sufficient to prevent substantial expansion of the resulting plastic mass in the extruder, and
      (3) extruding the resulting cooked plastic mass into the atmosphere.

8. A method as in claim 7 in which said ingredients include sodium caseinate in an amount between 7.5% and 25%, sugar in an amount between 15% and 30%, propylene glycol in an amount between 3% and 6%, starch in an amount between 0.5% and 10%, and a member selected from the group consisting of meat, meat by-products and mixtures thereof in an amount between 30% and 70%, the amounts of said ingredients being expressed as percent by weight of the total ingredients.

9. A method for the manufacture of a substantially-solid semi-moist animal food resembling marbled meat comprising the following steps:
   (a) smearing into a sheet-like shape a first extrudate of unexpanded storage-stable semi-moist animal food having the appearance of lean red meat, and having incorporated therein a caseinate-salt adhesive in an amount between 7.5% and 25% by weight based on the weight of the first extrudate thereby providing a first sheet-like shape,
   (b) extruding a fat-like extrudate of unexpanded storage-stable semi-moist animal food having the appearance of fat,
   (c) superimposing the fat-like extrudate on the first sheet-like shape,
   (d) smearing the resulting superimposed extrudates into sheet-like shapes,
   (e) forming the resulting sheet-like shapes into a loaf-like mass,
      said superimposing and said smearing taking place while the average temperature of the first and second extrudates is above 120° F., said forming taking place while the average temperature of the sheets is between 120° F. and 170° F., said first and second extrudates being produced by a cooking-extrusion process comprising the steps of:
         (1) admixing comminuted animal-food ingredients which include a total moisture content between about 20% and about 50%, said ingredients having been selected to provide a substantially-solid storage-stable nutritious pet food after cooking the resulting admixture,
         (2) subjecting the resulting admixture to cooking conditions at a temperature between 170° and 300° F. and at a superatmospheric pressure sufficient to prevent substantial expansion of the resulting plastic mass in the extruder, and
         (3) extruding the resulting plastic mass into the atmosphere.

References Cited

UNITED STATES PATENTS

| 2,802,737 | 8/1957 | Anson et al. | 99—107 |
| 2,813,025 | 11/1957 | Anson et al. | 99—107 |
| 2,830,902 | 4/1958 | Anson et al. | 99—107 |
| 2,957,770 | 10/1960 | Freund et al. | 99—107 |
| 2,964,409 | 12/1960 | Sair | 99—107 |
| 3,102,031 | 8/1963 | MacAllister et al. | 99—14 |
| 3,115,409 | 12/1963 | Hallinan et al. | 99—2 |
| 3,202,514 | 8/1965 | Burgess et al. | 99—2 |
| 3,320,070 | 5/1967 | Hartman | 99—17 |

RAYMOND N. JONES, *Primary Examiner.*

H. H. KLARE, *Assistant Examiner.*